J. A. PETERSON.
HOLDER FOR LAMPS OR HEADLIGHTS.
APPLICATION FILED MAR. 7, 1916.
1,222,458.  Patented Apr. 10, 1917.
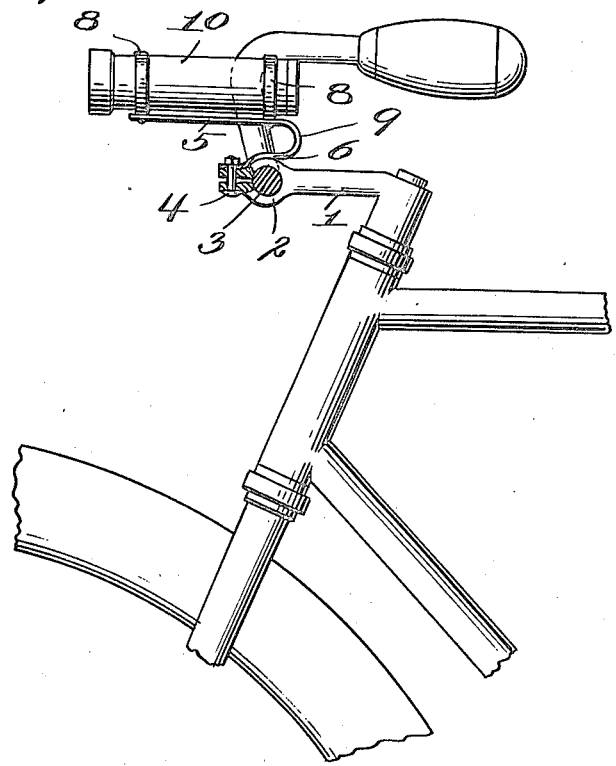
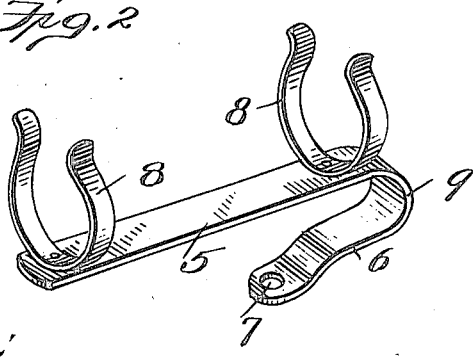
Witnesses:
Inventor
John A. Peterson
by James L. Norris,
Attorney

UNITED STATES PATENT OFFICE.

JOHN A. PETERSON, OF ALAMEDA, CALIFORNIA.

HOLDER FOR LAMPS OR HEADLIGHTS.

1,222,458.     Specification of Letters Patent.     Patented Apr. 10, 1917.

Application filed March 7, 1916. Serial No. 82,683.

*To all whom it may concern:*

Be it known that I, JOHN A. PETERSON, a citizen of the United States, residing at Alameda, in the county of Alameda and State of California, have invented new and useful Improvements in Holders for Lamps or Headlights, of which the following is a specification.

This invention relates to holders for the lamps or headlights of bicycles or motorcycles, and its objects are to provide a holder which is specially constructed to maintain an electric battery lamp and which may be readily and quickly fitted to the arm which carries the handle bars and will efficiently support the lamp in forwardly projecting relation and at the same time will provide a yieldable support for the lamp whereby the filament or other parts of the lamp structure will not be liable to injury in consequence of the vibration of the frame of the bicycle or motorcycle.

An embodiment of the invention is illustrated in the accompanying drawings, wherein:

Figure 1 is a view showing the holder as applied to a bicycle; and

Fig. 2 is a perspective view of the holder *per se.*

Similar characters of reference designate corresponding parts in both views.

Figure 1 shows a bicycle of well known construction wherein the axis of the front fork carries at its upper end a forwardly projecting horizontal arm 1 having a bifurcated sleeve 2 in which the handle bar 3 is fitted for rotatable adjustment, the sleeve 2, as usual, fitting over the central portion of the handle bar and having terminals which are connected by a bolt 4 employed to clamp the furcations of the sleeve upon the handle bar 3 and to thereby hold said bar against turning. The holder herein disclosed is applicable to a bicycle constructed as described and includes an elongated base 5 having at its rear end an under-turned attachment arm 6 whose forward extremity is provided with an opening 7 through which the bolt 4 passes, the attachment being clamped in position by the nut which is fitted on the upper end of said bolt. The base 5 is provided with spring clamps 8 of substantial U-shape which are rigidly attached to said base by rivets or otherwise and which are adapted to grip the cylindrical body or case of an electric battery lamp 10 of any suitable construction.

The attachment arm 6 is connected to the base 5 by a regularly curved bow 9 which enables said base to have a certain measure of resiliency or springiness relatively to said arm and thus provides for the resilient support of the lamp whereby the filament and other parts of the lamp structure will not be injured in consequence of the vibration of the bicycle frame.

The base 5 is nearly as long as the lamp and, therefore, furnishes a stable support for the lamp. Owing to the fact that the arm 6 is located at the rear end of said base and is relatively short, the lamp supported on the base will project forwardly from the handle bar 3, whereby the full benefit of the light at the front end of the lamp will be realized. The lamp may be readily fitted upon or removed from the holder, the arms of the spring clamps 8 yielding to provide for the application or removal of the lamp. Said arms, however, are shaped to conform to the shape of the lamp casing and grip the casing with a measure of friction sufficient to prevent accidental displacement of the lamp in any direction. Owing to the attachment of the arm 6 to the arm 1 which is mounted upon the steering post of the cycle, the lamp holder will be turned with the handle bars as the latter are operated to steer the cycle and, hence, the lamp will always shed its rays in the direction in which the cycle is moving.

I claim:

1. An electric-battery-lamp holder for bicycles or motorcycles comprising an elongated base provided with upright lamp clamps and with an under-turned attachment arm extending from one end thereof which provides for the springing or yielding of the base in consequence of the vibration of the cycle frame.

2. An electric-battery-lamp holder for bicycles or motorcycles comprising an elongated base provided with upright lamp clamps and having at its rear end a regularly curved depending bow terminating in a relatively short attachment arm disposed under said base.

3. An electric battery lamp holder for bicycles or motorcycles comprising an elongated base provided with upright lamp clamps and with an under-turned attachment arm adapted for retaining engagement by the usual clamping nut which secures the handle bar at the center thereof in the usual handle bar clamping sleeve at the upper end of the front fork.

In testimony whereof I have hereunto set my hand in presence of two subscribing witnesses.

JOHN A. PETERSON.

Witnesses:
E. H. ZION,
L. L. DENNETT.